United States Patent [19]

Melton et al.

[11] Patent Number: 4,542,897
[45] Date of Patent: Sep. 24, 1985

[54] EXERCISE CYCLE WITH INTERACTIVE AMUSEMENT DEVICE

[76] Inventors: Donald L. Melton, 14722 Oak Pine, Houston, Tex. 77040; William L. Thomas, III, 10815 Cypresswood, Houston, Tex. 77070

[21] Appl. No.: 540,290

[22] Filed: Oct. 11, 1983

[51] Int. Cl.$^4$ ............................................. A63B 21/00
[52] U.S. Cl. ..................................... 272/73; 272/132; 272/DIG. 5; 272/DIG. 6; 128/668; 273/DIG. 28
[58] Field of Search ....................... 272/69, 72, 73, 76, 272/78, 96; 280/289 D, 289 H; 273/DIG. 28, 1 E, 85 G; 128/668

[56] References Cited

U.S. PATENT DOCUMENTS

| | | | |
|---|---|---|---|
| 3,240,947 | 3/1966 | Mas | 272/73 |
| 4,313,602 | 2/1982 | Sullivan | 272/73 |
| 4,408,183 | 10/1983 | Wills | 272/DIG. 6 |
| 4,408,613 | 10/1983 | Relyea | 272/DIG. 6 |
| 4,438,921 | 3/1984 | Szymski | 272/73 |
| 4,443,008 | 4/1984 | Shimano | 272/73 |

FOREIGN PATENT DOCUMENTS

| | | | |
|---|---|---|---|
| 2822343 | 11/1979 | Fed. Rep. of Germany | 272/73 |
| 2448138 | 10/1980 | France | 272/73 |

Primary Examiner—Richard C. Pinkham
Assistant Examiner—MaryAnn Stoll Lastova
Attorney, Agent, or Firm—Neal J. Mosely

[57] ABSTRACT

An exercycle combined with a video game computer and game control allows the physical effort of the operator to generate electrical current for operation of the game control permitting the operator to control and interact with the computer upon maintaining a predetermined level of physical effort. Although the computer is activated by a separate power source, the generator, upon attainment of a predetermined energy expenditure level, activates the computer game. The apparatus provides amusement and an incentive to perform monotonous exercise routines as well as developing mental and manual coordination skills simultaneously with physical development.

20 Claims, 7 Drawing Figures

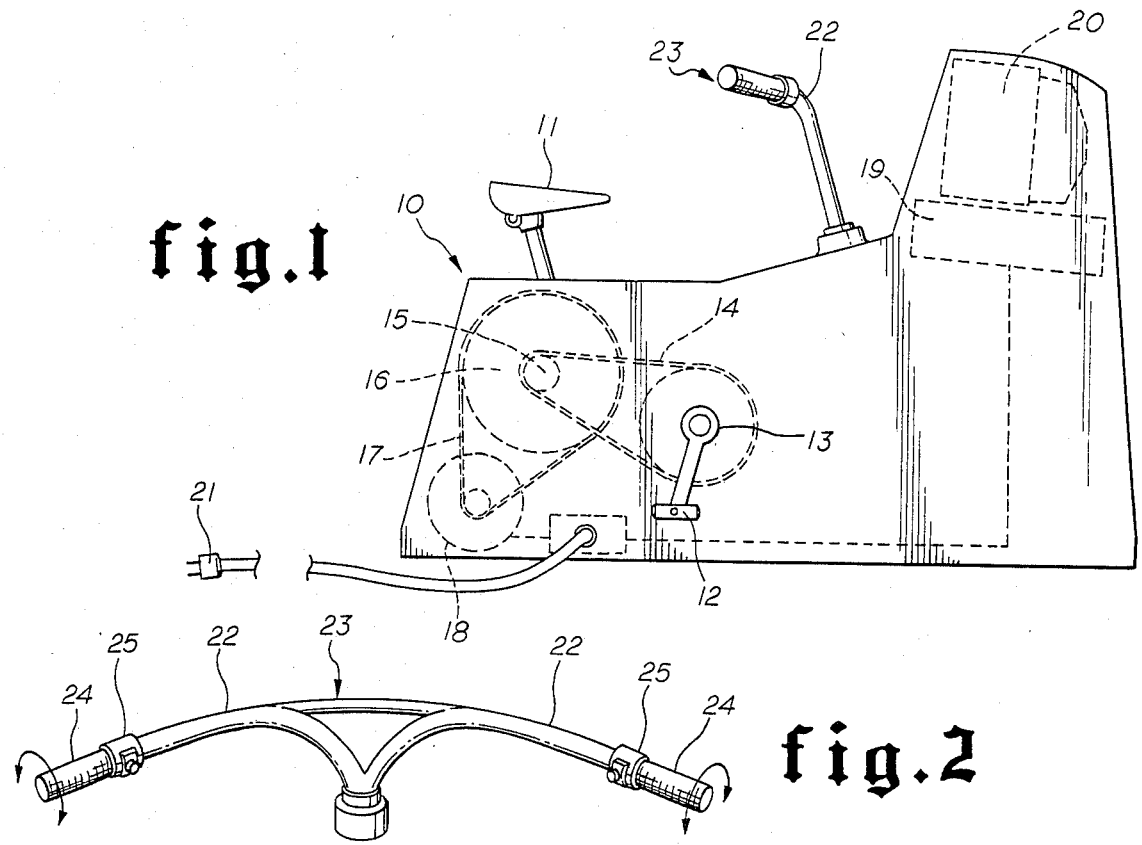
fig.1
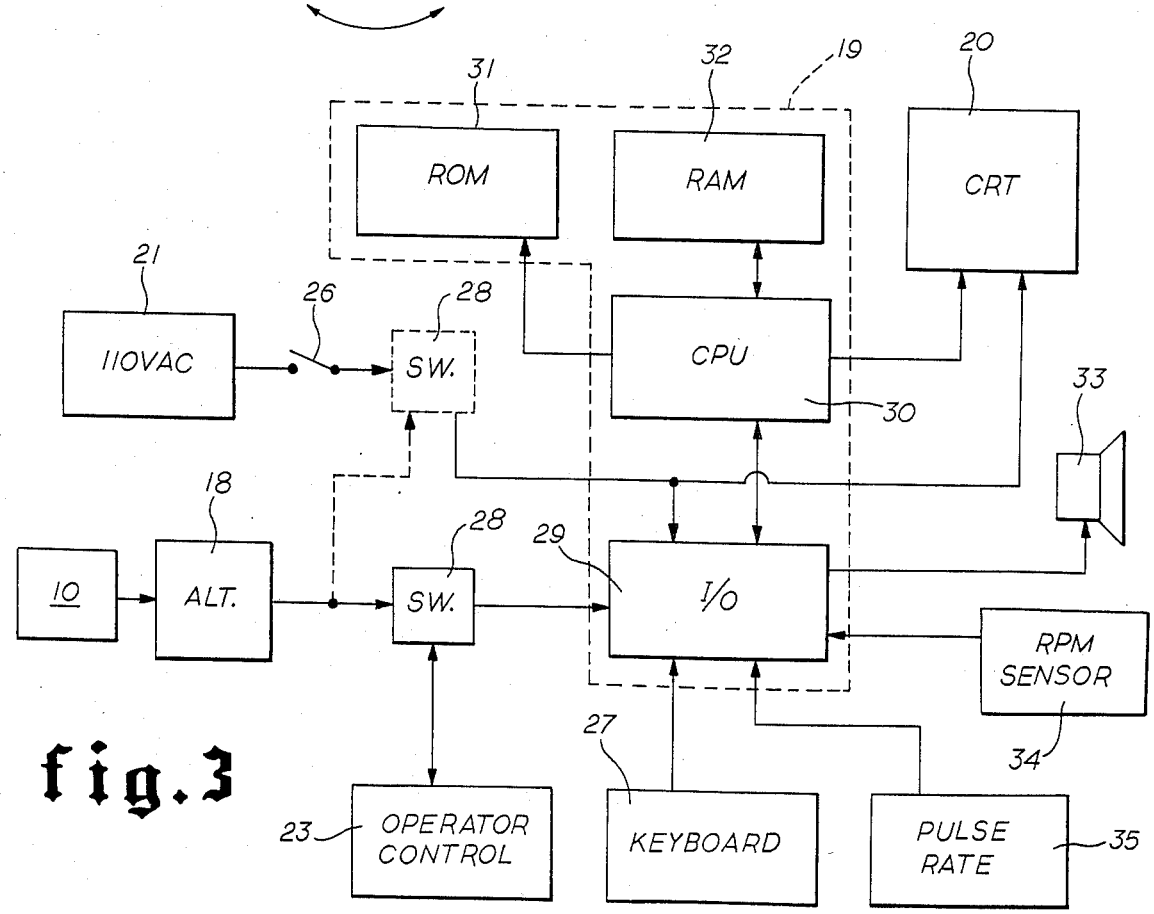
fig.2
fig.3

EXERCISE CYCLE WITH INTERACTIVE AMUSEMENT DEVICE

BACKGROUND OF THE INVENTION

1. Field of the Invention

This invention relates to exercise apparatus, and more particularly to a cycle type exerciser, combined with a video game or computer for providing amusement and an incentive to perform monotonous exercise routines as well as developing mental and manual coordination skills simultaneously with physical development.

2. Brief Description of the Prior Art

Using a bicycle or exercise cycle as a means of powering an amusement device or television set is known in the prior art. There are several patents which disclose bicycles and exercise cycles in combination with various amusement and video devices.

Stern, U.S. Pat. No. 3,210,634 discloses a bicycle for driving a generator.

Mullen, U.S. Pat. No. 1,653,921 discloses an amusement device mechanically and electrically coupled to an exercise bicycle.

Bisberg, U.S. Pat. No. 3,903,613 discloses an exercise bicycle with a tape playback unit, stereo and or video projector coupled to the equipment.

Sweeney, U.S. Pat. No. 4,358,105 discloses a programmed computer with displays attached to an exercise bicycle.

Lapeyre, U.S. Pat. No. 4,278,095 discloses a television monitor controlled by an exercise treadmill.

Emmons, U.S. Pat. No. 4,141,630 discloses an exercise bicycle with a projector arrangement for showing distance indicating pictures.

Barron, U.S. Pat. No. 3,984,666 discloses an exercise bicycle having a calorie consumption indicator.

Holmes, U.S. Pat. No. 4,298,893 discloses an exercise bicycle which powers a television set.

The prior art in general, and none of these patents in particular, is concerned with the combination of an exercise cycle with a video game computer and game control where the physical effort of the operator generates the electric current for operating the game control, thus permitting the operator to control and interact with the computer to provide amusement and an incentive to perform monotonous exercise routines as well as developing mental and manual coordination skills simultaneously with physical development.

The standard electronics notation used herein and the specifications for various standard components are found in the literature, e.g. ELECTRONICS FOR THE MODERN SCIENTIST, P. B. Brown et al., Elsevier Science Publishing Co., Inc., 1982; ENCYCLOPEDIA OF COMPUTER SCIENCE AND ENGINEERING, 2nd ED., Van Nostrand Reinhold Co., Inc., 1983; ENCYCLOPEDIA OF INTEGRATED CIRCUITS, W. H. Buchman, Prentice-Hall Inc., 1981.

SUMMARY OF THE INVENTION

One object of the invention is to provide an exercise cycle cooperative with a video game computer having means whereby the operator may control and interact with the computer upon maintaining a predetermined level of physical effort.

Another object of this invention is to provide an exercise cycle having a video game computer and video display powered independently of the electrical current generated by the physical effort of the operator.

Another object of this invention is to provide an exercise cycle which will simultaneously develop mental and manual coordination skills with physical exercise.

Another object of this invention is to provide an exercise cycle which will reduce boredom by providing amusement during monotonous exercise routines.

Another object of this invention is to provide an exercise cycle wherein the operator may selectively choose the form of amusement to maintain an interest in the routine exercise program.

Other objects of the invention will become apparent from time to time throughout the specification and claims as hereinafter related.

The above noted objects and other objects of the invention are accomplished by an exercycle combined with a video game computer and game control which allows the physical effort of the operator to generate electric current for operation of the game control permitting the operator to control and interact with the computer upon maintaining a predetermined level of physical effort. The apparatus provides amusement and an incentive to perform monotonous exercise routines as well as developing mental and manual coordination skills simultaneously with physical development.

BRIEF DESCRIPTION OF THE DRAWINGS

FIG. 1 is a side elevation view of an exercise apparatus, i.e. exercycle, having electrical power generating means and operator control means coupled with a video game computer.

FIG. 2 is a perspective view of the operator game control means.

FIG. 3 is a logic diagram of the system.

DESCRIPTION OF THE PREFERRED EMBODIMENT

Figure 4:
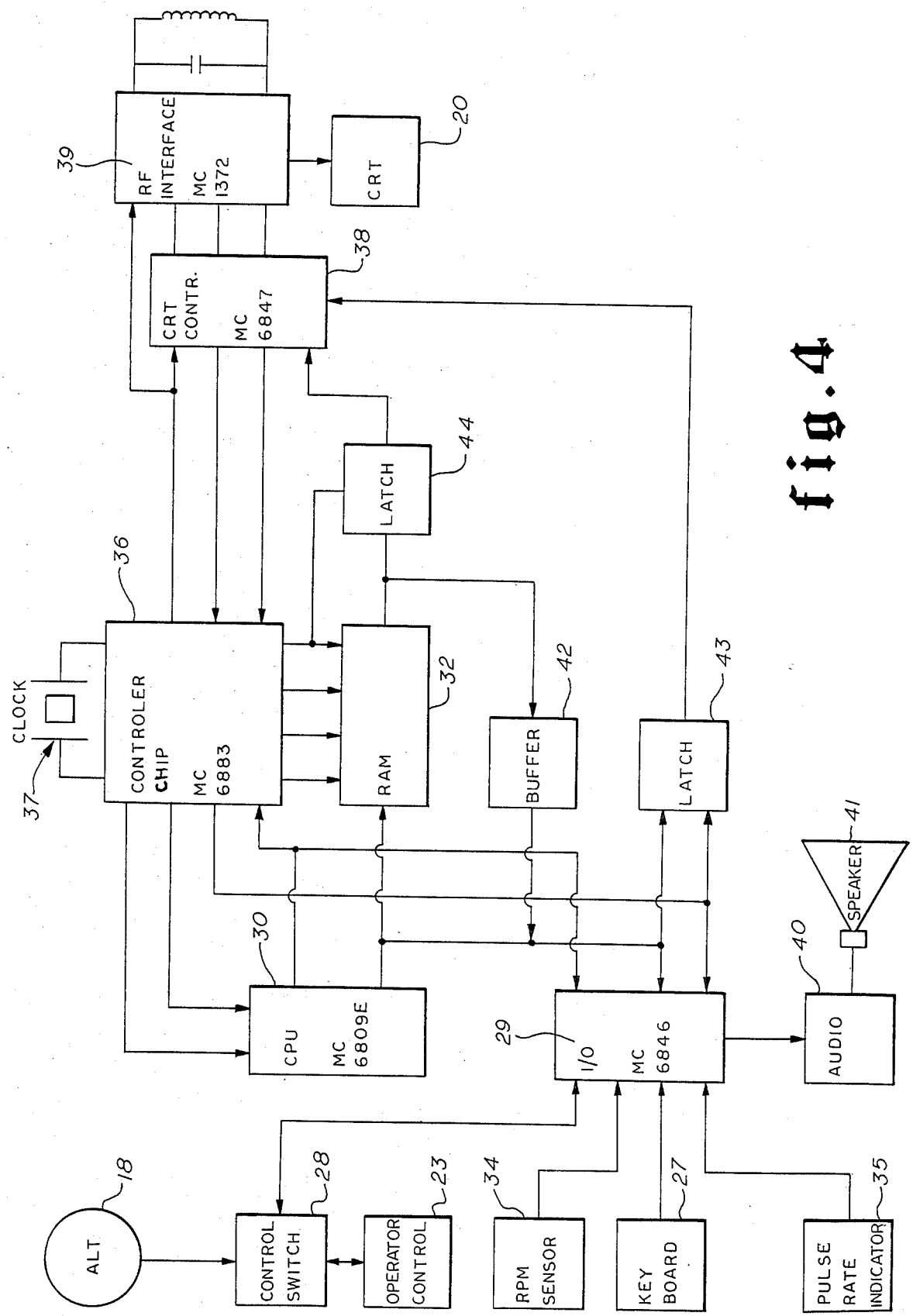
FIG. 4 is an electronic diagram of the computer and peripherals of the system.

Referring to the drawings by numerals of reference, there is shown in FIG. 1 a cycle type exercise apparatus 10. Although the apparatus used in the preferred embodiment is a cycle type, it should be understood that other types of exercise apparatus may be incorporated without departing from the scope of the present invention.

The cycle exercise apparatus 10 has the usual seat 11, pedals 12, and a pedal sprocket 13 connected by a chain 14 to a smaller sprocket 15 attached to a flywheel 16. The flywheel 16 is connected to suitable conventional means (not shown) for applying variable rotational resistance to the flywheel 16 for controlling the effort required to operate the apparatus 10. A second chain 17 connects the flywheel 16 to an alternator 18 to provide an electrical current for operating equipment associated with the exercise apparatus.

A video game computer 19 and a video display screen 20 are provided on exercise apparatus 10 and are powered by 110 V. AC. supplied by plug 21 when connected to a conventional electric outlet. The video game computer 19 and video display 20 are combined as an integral part of the apparatus 10 but may be separate units located apart from the apparatus, if desired.

Handlebars 22 (FIG. 2) provide the operator with video game control means 23 whereby the operator may control and interact with the video display 20. The handlebars 22 are rotatable to provide a horizontal control signal, and the hand grips 24 rotatable to provide a vertical control signal or speed control (depending upon the program used in the game computer). Two hand grips are provided so that left and right handed operators have the same advantage, or an operator may want to develop dexterity in his weaker side. A fire button 25 is provided adjacent to the hand grips 24 for interaction such as firing missiles, dropping bombs, etc. The handlebars 22, hand grips 24, and fire button 25 cooperate to provide the operator with control of the game action in the same manner as the popular joystick type game controllers. The electronic circuitry contained in the handlebars 22, hand grips 24, and fire buttons 25, is conventional and obvious to those skilled in the art and is therefore shown only schematically.

The logic diagram of the system is shown in FIG. 3. An on-off switch 26 is provided to activate the computer 19 and the video display or CRT 20 and to load a program or game cartridge into the computer 19. A keyboard 27 is provided in the system for entering specially designed programs. The program may be one specifically designed for an exercise routine, may be a conventional video game cartridge, or the operator may type in a program from keyboard 27. When switch 26 is closed, the computer 19 and the CRT 20 are operational.

Alternator 18 is connected to switch 28, which is connected to the game control means 23. The input-output or I/O component 29 is interposed between switch 28 and the CPU 30 of computer 19. Computer 19 and video display screen or CRT 20 are connected to receive their power from a 110 V. AC source independent of the current generated by the alternator 18.

The I/O component 29 is connected to a central processing unit or CPU 30. The CPU 30 is provided with a data control program stored in a read only memory or ROM chip 31. Program data, such as a game or exercise program is loaded into the CPU 30 through a random access memory, or ROM chip 32. Output data from the CPU 30 is produced visually on the CRT 20 and audibly on the audio component or speaker 33. The I/O component 29 can optionally be interfaced with various additional data gathering means, including RPM sensor 34, a pulse rate indicator 35, and/or a keyboard 27. The operator can thereby interact or compete with other operators with the additional input information.

Alternatively, the switch 28 may be connected between the on-off switch 26 and the I/O component 29 (shown in dotted line) so that the operators efforts are required to activate the switch 28 allowing the independent 110 V. AC source to power the complete system and thus prevent damage to the computer 19 or the programs by prolonged usage.

FIG. 4 shows the electronic circuitry of the system. Alternator 18 is connected to activate control switch 28 which establishes communication between the game control means 23 and I/O ROM chip 29 such as an MC 6846. Other data gathering means such as an RPM sensor 34, a programmable keyboard 27, and a pulse rate indicator 35, are interfaced with the I/O chip 29.

The I/O chip 29 communicates with a controller chip 36, such as an MC 6883, which is interfaced with a microprocessor (CPU) chip 30, such as an MC 6809E. In conjunction with a pulse generated by the clock 37, the controller chip 36 receives and transmits data between the I/O chip 29, gathers data from the RAM chip 32 and transmits it to the microprocessor chip 30. The microprocessor chip 30 in conjunction with the incoming programmed data in the I/O ROM chip 29 and the signal sent by the controller chip 36 will process the data and transmit it to the appropriate output component.

Video output data is transmitted through the controller chip 36 to a CRT controller chip 38 such as an MC 6847. Video output data in digital format is converted to an analog signal by an RF interface chip 39, such as an MC 1372. The converted signal is transmitted by coaxial cable to the CRT monitor 20 to produce a visual display of the data. The microprocessor 30 will send an audio signal to the audio decoder 40 through the I/O ROM chip 29 when determined by the processed data. The audio decoder 40 converts the digital formatted signal to an analog signal, amplifies it, and transmits it to the speaker 41.

Buffer 42 is interfaced with RAM chip 32 and the microprocessor 30. Latch 43 is interfaced with I/O ROM chip 29 and the CRT controller chip 38. Latch 44 is interfaced with controller 36, RAM chip 32, and CRT controller 38.

Figure 5:
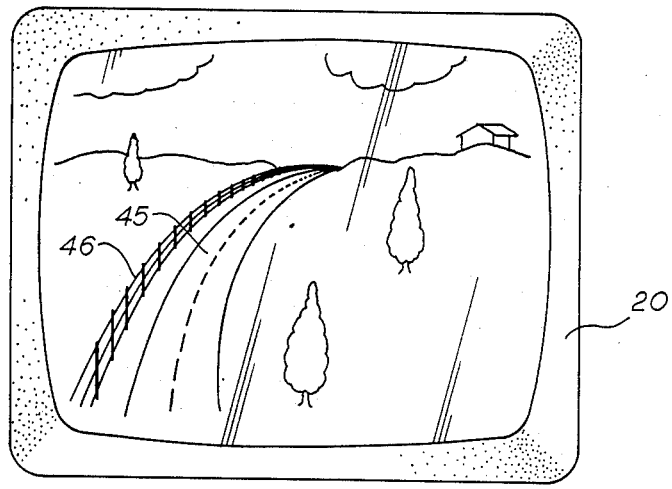
FIG. 5 is a view of a CRT screen illustrating one example of an amusement or game controlled or operated by the apparatus.
Figure 6:
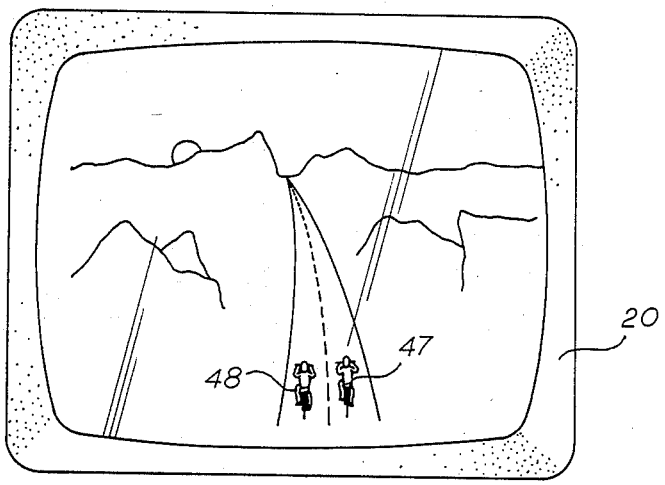
FIG. 6 is a view of a CRT screen illustrating an example of an amusement or game controlled or operated by the apparatus in which a competitive action is utilized.
Figure 7:
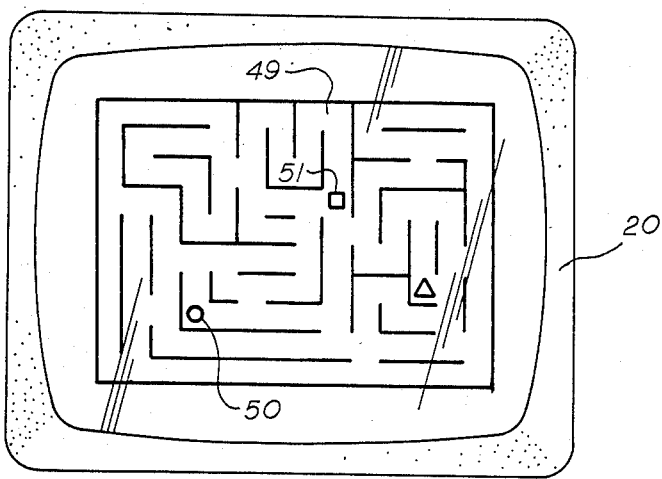
FIG. 7 is a view of a CRT screen illustrating an example of an amusement or game controlled or operated by the apparatus in which there is an interaction by the operator.

In FIGS. 5-7, there are shown three different examples of the types of amusement or game activity which may be displayed on the screen of the CRT 20. In FIG. 5, CRT 20 displays a scene of a road 45 extending from front to back of the screen in perspective. On each side of road 45 scenery 46, i.e. telephone poles, is depicted which is moved relative to the road to give the illusion of forward motion. The apparatus can be set to give a competitive action by the operator corresponding to a race against time with the CRT 20 indicating the rate of speed. This provides amusement and a standard of performance against which the operator can compete.

In FIG. 6, CRT 20 displays a scene of a road 45 extending from front to back of the screen in perspective. On each side of road 45 scenery 46, i.e. telephone poles, is depicted which is moved relative to the road to give the illusion of forward motion. The road 45 illustrated on the CRT 20 has one cyclist 47 which is programmed to race at a predetermined speed. A second cyclist 48 is shown which corresponds to the operator and moves along the screen at a variable rate of speed determined by the input from the apparatus. The apparatus is therefore set to give a competitive action by the operator corresponding to a race against cyclist 47. This apparatus may be connected to an adjacent machine to interact and compete with another operator. This provides amusement and a standard of performance against which the operator can compete.

In FIG. 7, CRT 20 displays a maze 49 which is exemplary of a variety of types of video arcade games. The maze 49 includes one contestant or character 50 which is hostile and moves according to a preset program. There is another contestant or character 51 which moves according to the input from the apparatus by the operator. This embodiment operates in the same manner as various conventional video arcade games but the input by the operator is determined by a selected level of performance on the exercise apparatus.

OPERATION

The operation of the apparatus should be apparent from the description of the construction and assembly but will be described in more detail for a fuller understanding of the invention.

The operator turns on the on-off switch 26 to activate the computer 19 and the video display or CRT 20, loads a program or game cartridge into the computer 19. The program may be specifically designed for an exercise routine, a conventional video game cartridge, or the operator may type in a program from a keyboard 27. At this time the computer 19 and the CRT 20 are operational and may be instructing or prompting the operator, or the display may be advertising the program, should the exercise apparatus be in commercial use in a spa.

The operator mounts the exercise apparatus 10, selects the level of effort desired, and turns the pedals 12. The rotational force of the pedals 12 is transmitted to the flywheel 16 and then to the alternator 18 which generates an electrical current to activate a switch 28. When the current generated by the alternator 18 reaches the predetermined level, the switch 28 closes a circuit allowing the game control means 23 to communicate with the input-output or I/O component 29 of the computer 19.

Computer 19 and video display screen or CRT 20 receive their power from a 110 V. AC source independent of the current generated by the alternator 18. The I/O component 29 is connected to a central processing unit or CPU 30. The CPU 30 is provided with a data control program stored in a read only memory or ROM chip 31. Program data, such as a game or exercise program is loaded into the CPU 30 through a random access memory, or RAM chip 32. Output data from the CPU 30 is produced visually the CRT 20 and audibly on the audio component 33. The I/O component 29 is interfaced with various additional data gathering means, such as an RPM sensor 34, a pulse rate indicator 35, and/or a keyboard 27. The operator can thereby interact or compete with other operators with the additional input information.

In contrast with prior art exercise apparatus in which the effort of the operator merely supplies the power for the video, the present invention provides an independent source of power to the computer 19 and CRT 20, however the operator cannot control or interact with the computer 19 or CRT 20 until his efforts reach a predetermined level and allow the game control means 23 to become operational. This allows the operator to stop exercising without losing the data stored in the computer memory, and allows the computer 19 or CRT 20 to prompt the operator to continue. It also allows one operator to dismount and another operator to mount the apparatus 10 and compete with the first without having to restart the game or exercise routine.

In the embodiment of FIG. 5, CRT 20 displays a scene of a road 45 extending from front to back of the screen in perspective. On each side of road 45 scenery 46, i.e. telephone poles, is depicted which is moved relative to the road to give the illusion of forward motion. The input by the operator gives a competitive action on CRT 20 corresponding to a race against time. This provides amusement and a standard of performance against which the operator can compete. In the embodiment of FIG. 6, CRT 20 displays a scene of a road 45 extending from front to back of the screen in perspective. On each side of road 45 scenery 46, i.e. telephone poles, is depicted which is moved relative to the road to give the illusion of forward motion. The road 45 illustrated on the CRT 20 has one cyclist 47 which is programmed to race at a predetermined speed. A second cyclist 48 is shown which corresponds to the operator and moves along the screen at a variable rate of speed determined by the input from the apparatus. The apparatus is therefore set to give a competitive action by the operator corresponding to a race against cyclist 47. This provides amusement and a standard of performance against which the operator can compete.

In the embodiment of FIG. 7, CRT 20 displays a maze 49 which is exemplary of a variety of types of video arcade games. The maze 49 includes one contestant or character 50 which is hostile and moves according to a preset program. There is another contestant or character 51 which moves according to the input from the apparatus by the operator. The control of the second character by the operator is effected by control mechanism 23 and the separate controls 24 and 25 which give a type of control similar to the joy stick control of a conventional arcade type game. This embodiment operates in the same manner as various conventional video arcade games but the input by the operator is determined by a selected level of performance on the exercise apparatus which determines when the main control switch 28 is activated.

While this invention has been described fully and completely with special emphasis upon a preferred embodiment, it should be understood that within the scope of the appended claims the invention may be practiced otherwise than as specifically described herein.

We claim:

1. The combination of stationary-mounted, pedal-operated exercise apparatus with a computer operated video display apparatus which provides operator interaction with a computer during an exercise program, comprising;

a pedal operated exercise apparatus mounted in a fixed position on a stationary surface for use in exercising by an operator by pedaling in a fixed position, an electric generator operated by said pedal operated apparatus, switch means connected to said generator and activated upon a predetermined output from said generator corresponding to a predetermined energy expenditure level by the operator of said exercise apparatus, a computer having a power source independent from said generator, a video display interfaced with said computer and having a power source independent from said generator, means on said exercise apparatus controlled and operated by the operator for interactively playing a game on said computer, and said switch means being operatively distinct from said operator-controlled means and connected in circuit between said computer and said operator-controlled means and permitting game playing on said computer only when said switch means is activated by said generator.

2. The apparatus combination according to claim 1 including
data gathering means interfaced with said computer for monitoring the condition of the operator or the apparatus.

3. The apparatus combination according to claim 2 wherein
said data gathering means comprises an RPM sensor means to determine the operator energy expenditure level.

4. The apparatus combination according to claim 2 wherein
said data gathering means comprises a pulse rate indicator to determine the operator energy expenditure level.

5. The apparatus combination according to claim 1 wherein
said switch means is interposed between the independent power source and said computer and video display.

6. The apparatus combination according to claim 1 wherein
said switch means remains activated only as long as the predetermined operator energy expenditure level is maintained.

7. The apparatus combination according to claim 1 wherein
said generator comprises an alternator.

8. The apparatus combination according to claim 1 wherein
said computer is positioned in a fixed position remote from said exercise apparatus.

9. The apparatus combination according to claim 1 wherein
said video display is positioned in a fixed position remote from said exercise apparatus.

10. The apparatus combination according to claim 1 wherein
said operator-controlled means comprises a movable handlebar assembly.

11. The apparatus combination according to claim 1 wherein
said operator-controlled means comprises a programmable keyboard.

12. The apparatus combination according to claim 1 wherein
said computer is programmed to produce a visual display on said video display providing amusement and recreation in a fixed position in view of the operator while said exercise apparatus is operated at a predetermined rate.

13. The apparatus combination according to claim 1 wherein
said computer is programmed to produce a visual competitive game display on said video display providing competitive recreation in a fixed position in view of the operator while said exercise apparatus is operated at a predetermined rate.

14. The apparatus combination according to claim 13 wherein
said video display comprises a moving scene simulating a competition by the operator against time while said exercise apparatus is operated at not less than a predetermined rate.

15. The apparatus combination according to claim 13 wherein
said computer is programmed to produce a visual display on said video display comprising a competitive game operable only while said exercise apparatus is operated at not less than a predetermined rate.

16. The apparatus combination according to claim 15 wherein
said competitive game comprises a game modified by operation of said operator-controlled means.

17. The apparatus combination according to claim 16 wherein
said operator-controlled means comprises a movable handlebar assembly.

18. The apparatus combination according to claim 17 wherein
said handlebar assembly includes a plurality of switches controlling signal inputs to said computer.

19. The apparatus combination according to claim 15 wherein
said operator-controlled means comprises a programmable keyboard.

20. The apparatus combination according to claim 15 wherein
said operator-controlled means comprises a programmable keyboard, and
a movable handlebar assembly including a plurality of switches controlling signal inputs to said computer.

* * * * *